US011580132B2

(12) United States Patent
Harada (10) Patent No.: US 11,580,132 B2
(45) Date of Patent: Feb. 14, 2023

(54) MEASUREMENT SOLUTION SERVICE PROVIDING SYSTEM

(71) Applicant: Teclock SmartSolutions Co., Ltd., Okaya (JP)

(72) Inventor: Kentaro Harada, Nagano (JP)

(73) Assignee: Teclock SmartSolutionsCo., Ltd., Nagano (JP)

( * ) Notice: Subject to any disclaimer, the term of this patent is extended or adjusted under 35 U.S.C. 154(b) by 748 days.

(21) Appl. No.: 16/489,177

(22) PCT Filed: Feb. 26, 2018

(86) PCT No.: PCT/JP2018/006882
§ 371 (c)(1),
(2) Date: Aug. 27, 2019

(87) PCT Pub. No.: WO2018/159514
PCT Pub. Date: Sep. 7, 2018

(65) Prior Publication Data
US 2019/0384773 A1 Dec. 19, 2019

(30) Foreign Application Priority Data
Feb. 28, 2017 (JP) .............................. JP2017-036969

(51) Int. Cl.
*G06F 16/25* (2019.01)
*G06F 16/28* (2019.01)
*G06F 16/17* (2019.01)

(52) U.S. Cl.
CPC .......... *G06F 16/258* (2019.01); *G06F 16/282* (2019.01)

(58) Field of Classification Search
CPC .... G06F 16/258; G06F 16/282; G06F 3/0481; G06F 13/00; G06F 16/1794; G05B 19/418
See application file for complete search history.

(56) References Cited

U.S. PATENT DOCUMENTS 10,817,530 B2 * 10/2020 Siebel ..................... H04L 67/12
2006/0058982 A1  3/2006 Yamada et al.
(Continued)

FOREIGN PATENT DOCUMENTS

JP  2003-090742  3/2003
JP  2003-272074  9/2003
(Continued)

OTHER PUBLICATIONS

Imura, et al., Forum Concerning 8th Data Engineering and Information Management, Open Data Collection for Five Persons and Safety Operation Support (14th Japan Database Society Annual Meeting), Japan, Institute of Electronics, Information and Communication Engineers Data Engineering Research Special Committee Japan Database Academic Agency's Database System Research Institute, Mar. 2, 2016, 7 pages—A concise explanation of relevance can be found in the English translation of the Japanese Office Action cited herein.

(Continued)

*Primary Examiner* — Alford W Kindred
*Assistant Examiner* — Cecile H Vo
(74) *Attorney, Agent, or Firm* — Hamre, Schumann, Mueller & Larson, P.C.

(57) ABSTRACT

A cloud computing system, which works in cooperation with a plurality of relay devices, is configured to receive measurement data transmitted from each of the relay devices arranged in respective bases and perform accumulation processing in a hierarchical structure of a logical tree form in a measurement database, and perform aggregation analysis processing on the measurement data subjected to the accumulation processing in the respective bases and for each integration target between the bases. The aggregation analysis processing is performed on the measurement data for the each integration target between the bases by recognizing a (Continued)

relationship between the bases under the same starting point on the basis of a measurement unit of a measurement value or a type of a measurement source as for the value in the source accumulated in the database as an ending point of the hierarchical structure.

15 Claims, 5 Drawing Sheets

(56) References Cited

U.S. PATENT DOCUMENTS

| | | | | |
|---|---|---|---|---|
| 2014/0337429 | A1* | 11/2014 | Asenjo | H04L 67/10 |
| | | | | 709/204 |
| 2014/0343743 | A1 | 11/2014 | DaCunha et al. | |
| 2017/0357738 | A1* | 12/2017 | Garske | G06F 30/13 |

FOREIGN PATENT DOCUMENTS

| | | |
|---|---|---|
| JP | 2004-133632 | 4/2004 |
| JP | 2013-161395 | 8/2013 |
| JP | 2015-534167 | 11/2015 |
| JP | 2016-522939 | 8/2016 |
| JP | 2016-224578 | 12/2016 |
| WO | 2015/029969 | 3/2015 |

OTHER PUBLICATIONS

International Search Report issued in International Application No. PCT/JP2018/006882, dated Mar. 20, 2018, 3 pages.

English Translation of Japanese Office Action issued in Japanese Patent Application No. 2017-036969, dated Jul. 3, 2018, 3 pages.

\* cited by examiner

MEASUREMENT DATA AA IN DIFFERENT FORMAT

MEASUREMENT DATA BB IN DIFFERENT FORMAT

MEASUREMENT DATA CC IN DIFFERENT FORMAT

FIG. 3

MEASUREMENT DATA DD IN COMMON FORMAT

32 SaaS TYPE CLOUD

FIG. 9

MONITORING DISPLAY, ALERT NOTIFICATION EXAMPLE

FIG. 10

MEASUREMENT SOLUTION SERVICE PROVIDING SYSTEM

TECHNICAL FIELD

The present invention relates to a measurement solution service providing system, and further relates to a measurement solution service providing method, a cloud computing system, and a measurement solution service providing program.

BACKGROUND ART

Recently, a technology referred to as Internet of Things (IoT) attracts attention. This IoT is a technology of realizing utilization of data generated from objects by making every object (sometimes referred to as a thing) accessible to the Internet with an OPEN characteristic.

The IoT technology is expected to be the fourth industrial revolution, and rapidly changes various industrial fields by connecting things to the Internet. For example, user spending in the domestic market grows at an average of 16.9%, and the domestic market in 2020 is predicted to reach 14 trillion yen. In Germany, an effort of industry 4.0 starts, and this is an active market worldwide.

On the background of this, in the measuring instrument manufacturing industry, this year is regarded as the IoT first year, and development of a measurement system using the IoT technology is expected along with the development of infrastructure (sometimes referred to as infra. or base).

However, until now, no system has been proposed to provide a measurement solution service that meets such expectations. For example, Patent Literature 1 discloses a background art related to the IoT technology in association with a cloud computing technology. Patent Literatures 2 and 3 disclose background art regarding the cloud computing technology. Patent Literature 4 discloses one technology regarding collection of measurement (measurement) data. Furthermore, Patent Literature 5 discloses one technology regarding display of measurement data.

RELATED ART LITERATURE

Patent Literature

Patent Literature 1: JP 2016-522939 A
Patent Literature 2: JP 2015-534167 A
Patent Literature 3: JP 2016-224578 A
Patent Literature 4: JP 2003-272074 A
Patent Literature 5: JP 2003-90742 A

DISCLOSURE OF THE INVENTION

Problems to be Solved by the Invention

In further detail, when collecting measurement data in different formats transmitted from a plurality of measurement sources arranged in a distributed manner in manufacturing bases (sites) and performing aggregation analysis processing and display processing, there are following four main problems in the conventional measurement system.

(1) An increase in aggregation cost of measurement data is inevitable. In other words, it takes many man-hours to aggregate data, and an operation cost increases.

(2) There is no immediacy in displaying the analysis results of the aggregated data. As a result, there is a delay in coping with deterioration in quality, and there is a risk of quality accidents and problems.

(3) It is difficult to integrate aggregation forms and data between manufacturing bases. That is, since data aggregation and analysis are generally performed at each base, it takes a lot of man-hours and labor to integrate data.

(4) It is difficult to automate data analysis. That is, in order to automate data analysis, introduction costs of servers and dedicated software individually occur at each base.

An object of the present invention is to provide a technology that makes it possible to realize an innovative measurement solution service regarding measurement data processing in cooperation with an IoT technology and a cloud computing technology.

Means for Solving the Problems

In order to solve the above-described problems, a measurement solution service providing system according to an aspect of the present invention is provided with a plurality of IoT relay devices arranged in respective bases, each including means for collecting measurement data in different formats transmitted from a plurality of measurement sources arranged in a distributed manner in each process in a base corresponding to a manufacturing site and measuring a quality status in each process, means for converting the collected measurement data in the different formats into measurement data in a common format, and means for transmitting the measurement data in the common format via a communication network for requesting to process the converted measurement data in the common format; and a cloud computing system including means for receiving the measurement data in the common format transmitted from each of the plurality of IoT relay devices and performing accumulation processing in a hierarchical structure in a measurement database, means for performing aggregation analysis processing on the measurement data in the common format subjected to the accumulation processing for each integration target, and means for performing display processing on a result of the aggregation analysis processing of the measurement data in the common format and transmitting a display processing result to a viewer terminal in response to a display request from the viewer terminal.

In this aspect, the measurement data in the different formats have data lengths different from each and include at least a measurement value in a measurement source as an item, and the measurement data in the common format has a predetermined data length and includes at least identification information for specifying a user of the cloud computing system, identification information for specifying the base corresponding to the manufacturing site, identification information for specifying the measurement source, a measurement value in the measurement source, and measurement time information as items determined in advance.

In this aspect, the measurement data in the common format is accumulated in the measurement database in a hierarchical structure of a logical tree form starting from the identification information for specifying the user of the cloud computing system, branching at the identification information for specifying the base corresponding to the manufacturing site and the identification information for specifying the measurement source, and ending at the measurement value in the measurement source and the measurement time information.

In this aspect, the measurement data in the common format is subjected to the aggregation analysis processing by statistical process control analysis so that graph display, data display, and monitoring display on the viewer terminal are selectively available.

In this aspect, the cloud computing system further includes means for constantly monitoring a result of the aggregation analysis processing in the monitoring display, and performing alert notification by visual display in a case of exceeding a predetermined threshold.

In this aspect, the cloud computing system further includes means for constantly monitoring a result of the aggregation analysis processing in the monitoring display, and performing preliminary alert notification by visual display in a case of exceeding an approaching threshold to a critical threshold determined in advance.

In this aspect, each of the plurality of measurement sources includes a measuring instrument, the cloud computing system is a SaaS type cloud, the IoT relay device is an IoT gateway, and the communication network is an IP network.

A measurement solution service providing method according to another aspect of the present invention includes: by each of a plurality of IoT relay devices arranged in respective bases, processing a step of collecting measurement data in different formats transmitted from a plurality of measurement sources arranged in a distributed manner in each process in a base corresponding to a manufacturing site and measuring a quality status in each process, a step of converting the collected measurement data in the different formats into measurement data in a common format, and a step of transmitting the measurement data in the common format via a communication network for requesting to process the converted measurement data in the common format; and by a cloud computing system, processing a step of receiving the measurement data in the common format transmitted from each of the plurality of IoT relay devices and performing accumulation processing in a hierarchical structure in a measurement database, a step of performing aggregation analysis processing on the measurement data in the common format subjected to the accumulation processing for each integration target, and a step of performing display processing on a result of the aggregation analysis processing of the measurement data in the common format and transmitting a display processing result to a viewer terminal in response to a display request from the viewer terminal.

A cloud computing system according to another aspect of the present invention is a cloud computing system which work in cooperation with a plurality of IoT relay devices each including: means for collecting measurement data in different formats transmitted from a plurality of measurement sources arranged in a distributed manner in each process in a base corresponding to a manufacturing site and measuring a quality status in each process; means for converting the collected measurement data in the different formats into measurement data in a common format; and means for transmitting the measurement data in the common format via a communication network for requesting to process the converted measurement data in the common format, the cloud computing system provided with: means for receiving the measurement data in the common format transmitted from each of the plurality of IoT relay devices arranged in respective bases and performing accumulation processing in a hierarchical structure in a measurement database; means for performing aggregation analysis processing on the measurement data in the common format subjected to the accumulation processing for each integration target; and means for performing display processing on a result of the aggregation analysis processing of the measurement data in the common format and transmitting a display processing result to a viewer terminal in response to a display request from the viewer terminal.

A measurement solution service providing program according to still another aspect of the present invention allows a cloud computing system which works with a plurality of IoT relay devices each including: means for collecting measurement data in different formats transmitted from a plurality of measurement sources arranged in a distributed manner in each process in a base corresponding to a manufacturing site and measuring a quality status in each process; means for converting the collected measurement data in the different formats into measurement data in a common format; and means for transmitting the measurement data in the common format via a communication network for requesting to process the converted measurement data in the common format, to serve as means for receiving the measurement data in the common format transmitted from each of the plurality of IoT relay devices arranged in respective bases and performing accumulation processing in a hierarchical structure in a measurement database, means for performing aggregation analysis processing on the measurement data in the common format subjected to the accumulation processing for each integration target, and means for performing display processing on a result of the aggregation analysis processing of the measurement data in the common format and transmitting a display processing result to a viewer terminal in response to a display request from the viewer terminal.

Effects of the Invention

According to the disclosed technology, it is possible to accumulate the measurement data in the common format in the cloud computing system in corporation with the IoT technology and the cloud computing technology and perform the aggregation analysis processing and the display processing, thereby providing the innovative measurement solution service capable of grasping the quality status in each process in the manufacturing base anytime and anywhere.

Other problems, features, and advantages will be apparent by reading the description of embodiments for implementing the invention to be described below when taken in conjunction with the drawings and claims.

MODE FOR CARRYING OUT THE INVENTION

Hereinafter, it is described in further detail with reference to the attached drawings. A preferred embodiment is illustrated in the drawings. However, the present invention may be implemented in many different modes and is not limited to the embodiment described in this specification.

Measurement Solution Service Providing System

Figure 1:
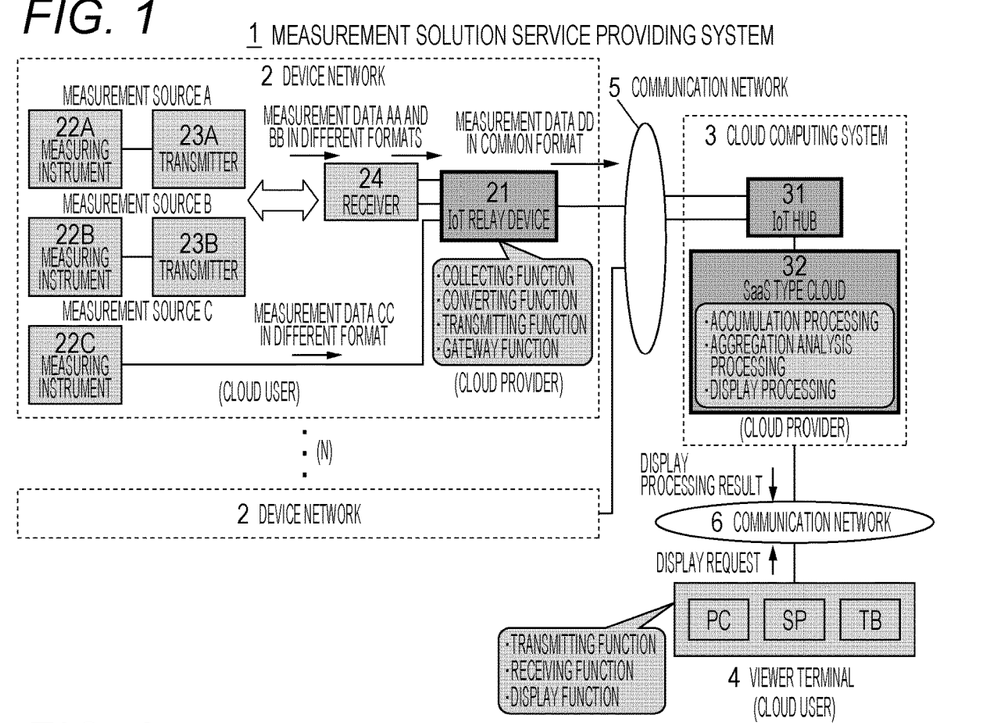
FIG. 1 is a block diagram illustrating a configuration of a measurement solution service providing system in one embodiment.

With reference to FIG. 1 illustrating a system configuration in one embodiment, a measurement solution service providing system 1 is a system which accumulates measurement data in a common format in a cloud computing system in corporation with an IoT technology and a cloud computing technology, and performs aggregation analysis processing and display processing, thereby providing an innovative measurement solution service capable of grasping a quality status in each process in a manufacturing base (site) anytime and anywhere.

The measurement solution service providing system 1 is provided with a plurality of device networks 2, a cloud computing system 3, a viewer terminal 4, a first communication network 5, and a second communication network 6. Herein, the first communication network 5 and the second communication network 6 are IP networks because the system 1 is premised on application of the IoT technology, and more specifically, the Internet having an OPEN characteristic. Note that, the communication networks 5 and 6 are sometimes the same network.

The device network 2 is a local area network (LAN) built in the manufacturing site of a contractor (a business user of a cloud) using the cloud computing system 3, that is, in a manufacturing site (manufacturing factory). There is a plurality of (N) device networks 2 built in domestic and/or overseas manufacturing sites.

Each device network 2 is provided with an IoT relay device 21, measuring instruments 22A, 22B, and 22C and wireless transmitters 23A and 23B as a plurality of measurement sources A, B, and C, and a wireless receiver 24.

The measuring instruments 22A and 22B in the plurality of measurement sources A, B, and C which are arranged in a distributed (discrete) manner in each process in the manufacturing site and measure a quality status in each process are digital measuring instruments and transmit measurement data AA and BB to the wireless receiver 24 by near field communication via the wireless transmitters 23A and 23B connected thereto. The measuring instrument 22C is an analog measuring instrument and transmits measurement data CC to the IoT relay device 21 by wired communication. The measurement data AA, BB, and CC are preferably transmitted autonomously from the plurality of measurement sources A, B, and C at predetermined intervals. Herein, the predetermined interval corresponds to a sampling time (for example, several minutes) appropriate for grasping the quality status of an object (thing) in each process in the manufacturing site.

Figure 2:
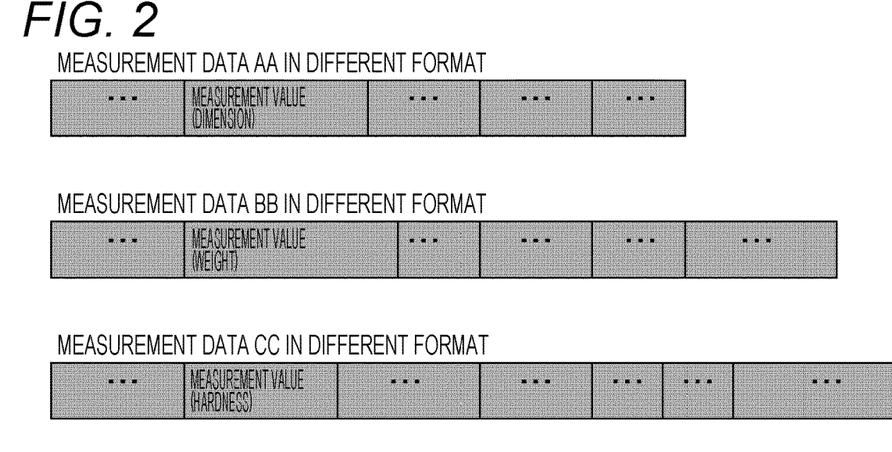
FIG. 2 is a view for illustrating measurement data in different formats in the system in one embodiment.

The measurement data AA, BB, and CC transmitted from the plurality of measurement sources A, B, and C to the receiver 24 and the IoT relay deice 21 are measurement data in different formats of data lengths (for example, few to tens of bytes) different for each measurement source at least including an item of a measurement value (length, weight, hardness and the like, for example) of a measuring target different for each measurement source as illustrated in FIG. 2. Herein, the measurement value includes a measurement unit (for example, mm, g and the like), but the measurement unit may be made another item.

A reason of the measurement data in the different formats is that manufacturers of the measuring instruments 22A, 22B, and 22C and the wireless transmitters 23A and 23B are different, and types of the measuring instruments 22A, 22B, and 22C are different such as a digital measuring instrument, an analog measuring instrument, a dimension measuring instrument, a weight measuring instrument, and a hardness measuring instrument. As is described later in detail, in this measurement solution service providing system 1, conversion processing of such measurement data in different formats into measurement data in a common format is an important element of the measurement solution.

The wireless receiver 24 receives the measurement data AA and BB transmitted from the measurement sources A and B, and inputs the same in a state of the measurement data in the different formats to the IoT relay device 21.

Each IoT relay device 21 specifically is an IoT gateway provided by a cloud provider and has a function of collecting in real time the measurement data AA, BB, and CC in the different formats transmitted from the plurality of measurement sources A, B, and C arranged in each process in the manufacturing site in a distributed manner and measuring the quality status in each process, and a function of converting the collected measurement data AA, BB, and CC in the different formats into measurement data DD in the common format.

The IoT relay device 21 also has a function of transmitting the measurement data DD in the common format to the cloud computing system 3 via the first communication network 5 in order to request processing of the converted measurement data DD in the common format.

The IoT relay device 21 further has a gateway function of converting a communication protocol of the device network 2 into an Internet Protocol (IP) of the first communication network 5 when transmitting the measurement data DD in the common format to the cloud computing system 3 via the first communication network 5. In this measurement solution service providing system 1, the gateway function connects things to the Internet.

Figure 3:
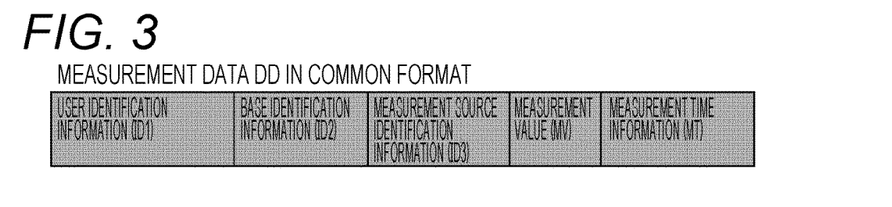
FIG. 3 is a view for illustrating measurement data in a common format in the system in one embodiment.

The measurement data DD in the common format is of a predetermined data length and at least includes identification information for specifying a business user of the cloud computing system 3 (user identification information) ID1, identification information for specifying a base corresponding to the manufacturing site (base identification information) ID2, identification information for specifying the measurement sources A, B, and C (measurement source identification information) ID3, measurement values MV in the measurement sources A, B, and C, and measurement time information MT in a form of year/month/day, and hour: minute as predetermined items as illustrated in FIG. 3.

Herein, the user identification information ID1, the base identification information ID2, the measurement source identification information ID3, and the measurement time information MT are added when converting the collected measurement data AA, BB, and CC in the different formats into the measurement data DD in the common format. For example, the user identification information ID1 and the base identification information ID2 are registered (stored) in advance in a memory (disk) of the IoT relay device 21 by the business user. The measurement source identification information ID3 may be generated on the basis of media access control (MAC) addresses and the like of the measurement sources A, B, and C accommodated in the IoT relay device 21. The measurement time information MT is generated on the basis of total seconds (accumulated seconds) in the IoT relay device 21 or a standard time, and strictly is information of collected (received) time.

Also, the measurement data DD in the common format to which source information SA for specifying the IoT relay device 21 and destination information DS for specifying the cloud computing system 3 are further added (not illustrated in FIG. 3) is transmitted to the cloud computing system 3 in real time in an IP packet form.

As is to be described later in detail, the measurement data DD in the common format transmitted from each IoT relay device 21 of each device network 2 and received by the cloud computing system 3 is stored (accumulated) in a hierarchical structure in a logical tree form in a measurement database of the cloud computing system 3.

The above-described IoT relay device 21 includes the following elements as a hardware configuration. That is, a central processing unit (CPU) as a processor, a random access memory (RAM) as a working memory, and a read only memory (ROM) which stores a boot program for startup are provided.

The IoT relay device 21 is also provided with a disk as a non-volatile flash memory which rewritably stores an operating system (OS), an application program, and various pieces of information (including data), a communication control unit, a communication interface unit such as a network interface card (NIC) and the like. These hardware configurations are not illustrated because one skilled in the art may easily understand and implement the same.

In order to logically realize each function described above, a processing program is installed as an application program in the flash memory. Then, in the IoT relay device 21, the processor (CPU) constantly develops this processing program in the RAM and executes the same when the power is turned on.

The cloud computing system 3 is a cloud server computer maintained and managed by the cloud provider, and is provided with an IoT hub 31 and a SaaS type cloud 32.

In the cloud computing system 3, the IoT hub 31 is connected to the plurality of (N) device networks 2 corresponding to a plurality of manufacturing sites of the business user via the first communication network 5.

Generally, cloud services provided by the cloud computing system include software as a service (SaaS), a platform as a service (PaaS), and an infrastructure as a service (IaaS).

Herein, the SaaS cloud service provides up to top application software (applications). The PaaS cloud service provides a complete platform including hardware for the application software to be operated, an operating system, and middleware. The IaaS cloud service provides an infrastructure including hardware (CPU and storage) and an operating system.

Figure 4:
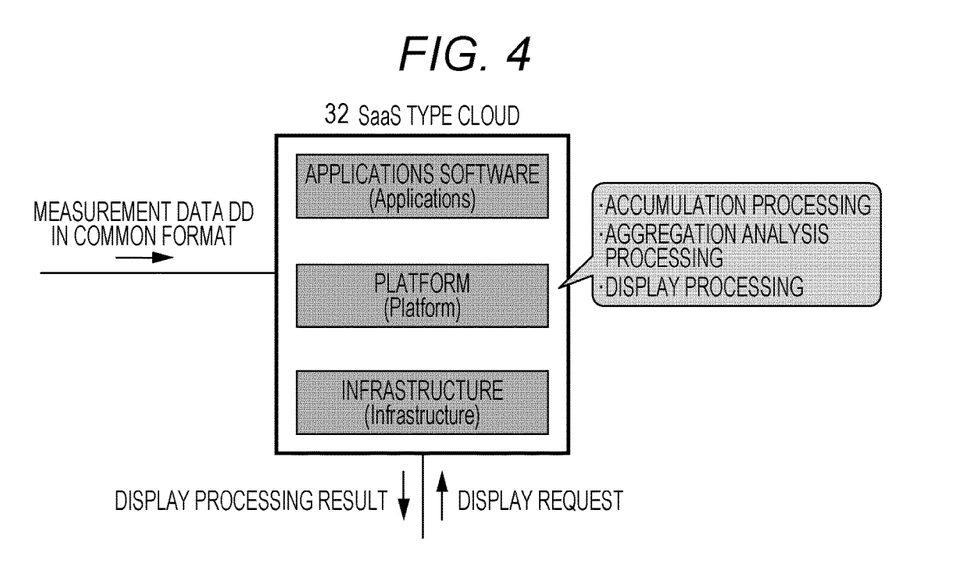
FIG. 4 is a view for illustrating a SaaS type cloud in the system in one embodiment.

In this cloud computing system 3, the SaaS type cloud 32 is adopted as illustrated in detail in FIG. 4. The SaaS type cloud 32 receives the measurement data DD in the common format transmitted from each IoT relay device 21 in real time via the first communication network 5 and the IoT hub 31. Then, the SaaS type cloud 32 performs accumulation processing and aggregation analysis processing on the received measurement data DD in the common format.

The SaaS type cloud 32 also performs the display processing of a result of the aggregation analysis processing of the measurement data DD in the common format subjected to the accumulation processing, and when there is a display request from the viewer terminal 4, this transmits a result of the display processing to the viewer terminal 4 via the second communication network 6.

Figure 5:
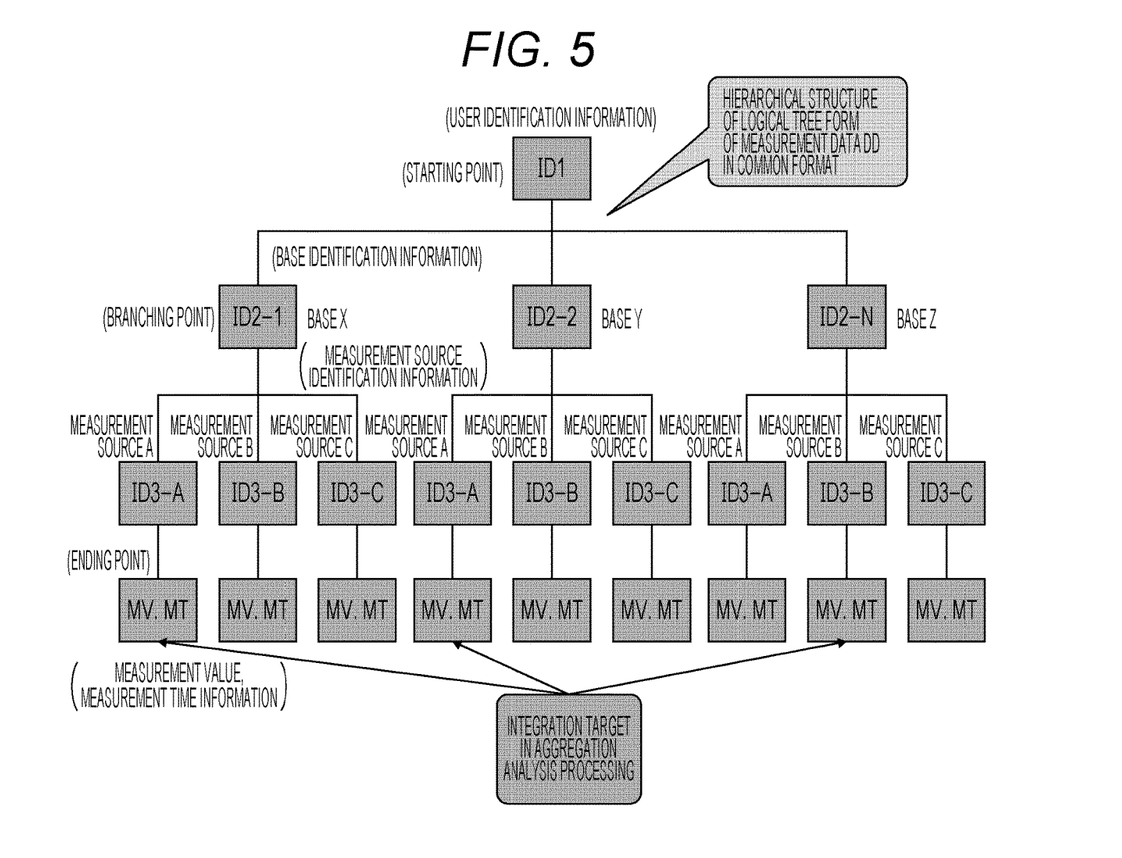
FIG. 5 is a view for illustrating a hierarchical structure of the measurement data in the common format in the system in one embodiment.
Figure 6:
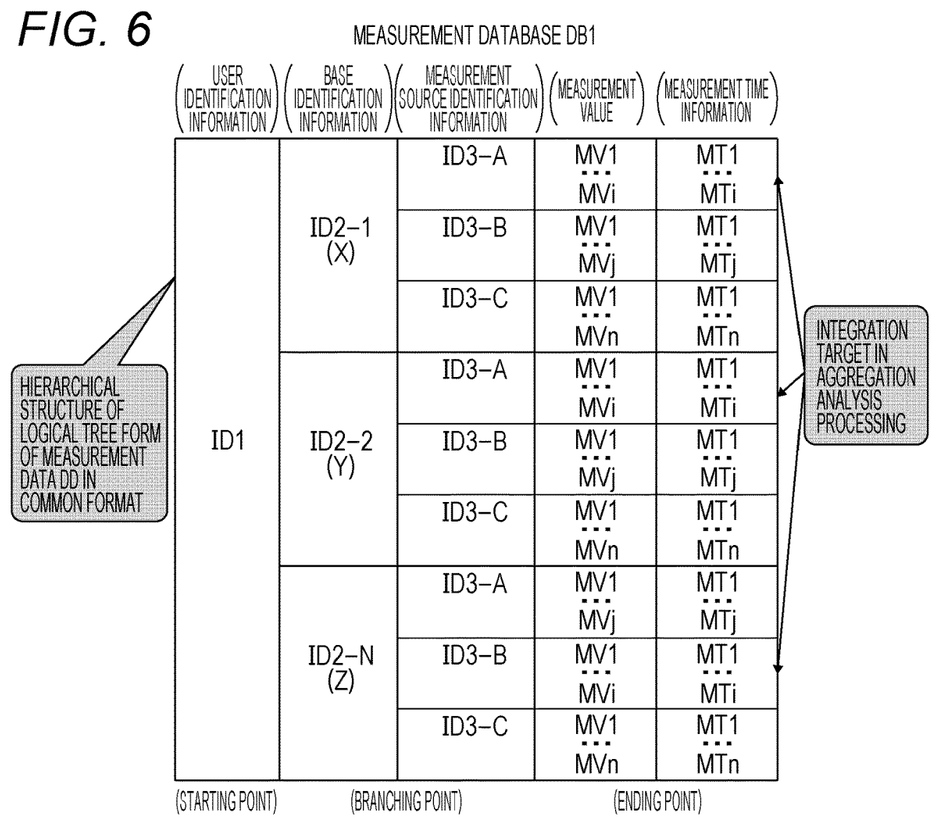
FIG. 6 is a view for illustrating a hierarchical structure of the measurement data in the common format in the system in one embodiment.

More specifically, the measurement data DD in the common format transmitted from each IoT relay device 21 of each device network 2 and received by the cloud computing system 3 is stored (accumulated) in the hierarchical structure in the logical tree form as illustrated in FIGS. 5 and 6 in the measurement database DB1 by the accumulation processing of the SaaS type cloud 32.

That is, the SaaS type cloud 32 sequentially accumulates the measurement values MV and the measurement time information MT in the measurement sources A, B, and C for each of bases X, Y, and Z corresponding to the hierarchy of the user identification information ID1—base identification information ID2—measurement source identification information ID3 in the measurement database DB1 by the accumulation processing of the received measurement data DD in the common format.

Therefore, the measurement data DD in the common format may be regarded as the hierarchical structure in the logical tree form starting from the user identification information ID1, branching at the base identification information ID2 and the measurement source identification information ID3, and ending at the measurement value MV and the measurement time information MT in the measurement database DB1.

The SaaS type cloud 32 processes the measurement values MV and the measurement time information MT in the measurement sources A, B, and C in each of the bases X, Y, and Z by statistical process control (SPC) analysis when performing the aggregation analysis processing on the measurement data DD in the common format in the measurement database DB1 subjected to the aggregation processing.

When the SaaS type cloud 32 performs the aggregation analysis processing, this integrates the measurement values MV and the measurement time information MT in the measurement sources A, B, and C of the bases X, Y, and Z and thereafter processes the same by the SPC analysis. For this integration, the SaaS type cloud 32 recognizes that the measurement values MV at the measurement sources A, B, and C of the bases X, Y, and Z are related to one another on the basis of the measurement unit included in the measurement value MV. FIG. 6 illustrates that the measurement values MV in the measurement source A in the base X (ID3-A), the measurement source A in the base Y (ID3-A), and the measurement source B in the base Z (ID3-B) are related to one another as integration targets.

Note that, in a case where the recognition on the basis of the measurement unit cannot be applied, the SaaS type cloud 32 recognizes the relation of the measurement values MV in the measurement sources A, B, and C of the bases X, Y, and Z on the basis of predetermined integration definition. In this integration definition, the measurement sources A, B, and C of the bases X, Y, and Z are set (registered) in advance in association with one another according to types of measuring instruments 22A, 22B, and 22C of the measurement sources A, B, and C in each of the bases X, Y, and Z, that is, the dimension measuring instrument, the weight measuring instrument, the hardness measuring instrument and the like.

Herein, the SPC analysis adopted by the SaaS type cloud 32 is a method of monitoring and visualizing processes using statistics and a graph. In the SPC analysis, graphs such as control charts (Xbar-R chart, Xbar-σ chart and the like), a histogram, a run chart, a boxplot, and a scatter chart, and statistics such as a process capability index Cp and a process performance index Pp may be displayed on one screen. This makes it possible to obtain a lot of pieces of quality analysis information regarding the process from one screen.

The SaaS type cloud 32 performs the aggregation analysis processing by the SPC analysis so that graph display, data display, and monitoring display of the measurement data DD in the common format accumulated in the measurement database DB1 to the viewer terminal 4, and stores the result of the aggregation analysis processing in a database (not illustrated).

Figure 7:
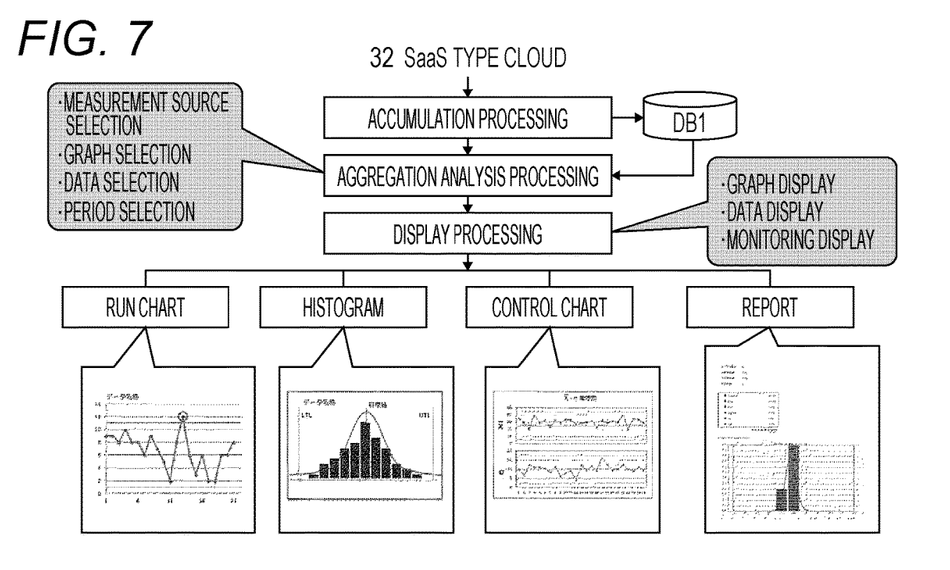
FIG. 7 is a view for illustrating processing of the SaaS type cloud in the system in one embodiment.

The SaaS type cloud 32 displays the graphs such as the histogram, the run chart, and the control chart as a display processing result when displaying the result of the aggregation analysis processing as a graph in response to the display request from the viewer terminal 4 (refer to FIG. 7).

Also, when the SaaS type cloud 32 displays the result of the aggregation analysis processing as data in response to the display request from the viewer terminal 4, this displays the data such as an average value, a maximum value, a minimum value, standard deviation, 3σ, and the process capability index Cp as the display processing result (report) (refer to FIG. 7).

Furthermore, the SaaS type cloud 32 displays the run chart and the like as the display processing result when monitoring displaying the result of the aggregation analysis processing in response to the display request from the viewer terminal 4 (refer to FIG. 7).

Figure 8:
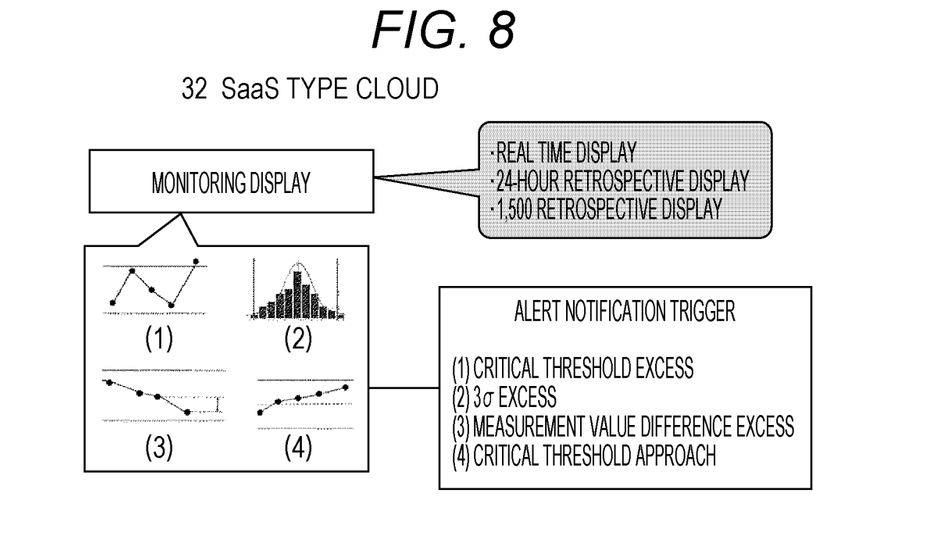
FIG. 8 is a view for illustrating the processing of the SaaS type cloud in the system in one embodiment.

Note that the display request from the viewer terminal 4 includes designation such as measurement source selection, graph selection, data selection, and period selection. The display request regarding the monitoring display further includes designation such as real time display, 24-hour retrospective display, and 1,500 retrospective display (refer to FIGS. 7 and 8).

Figure 9:
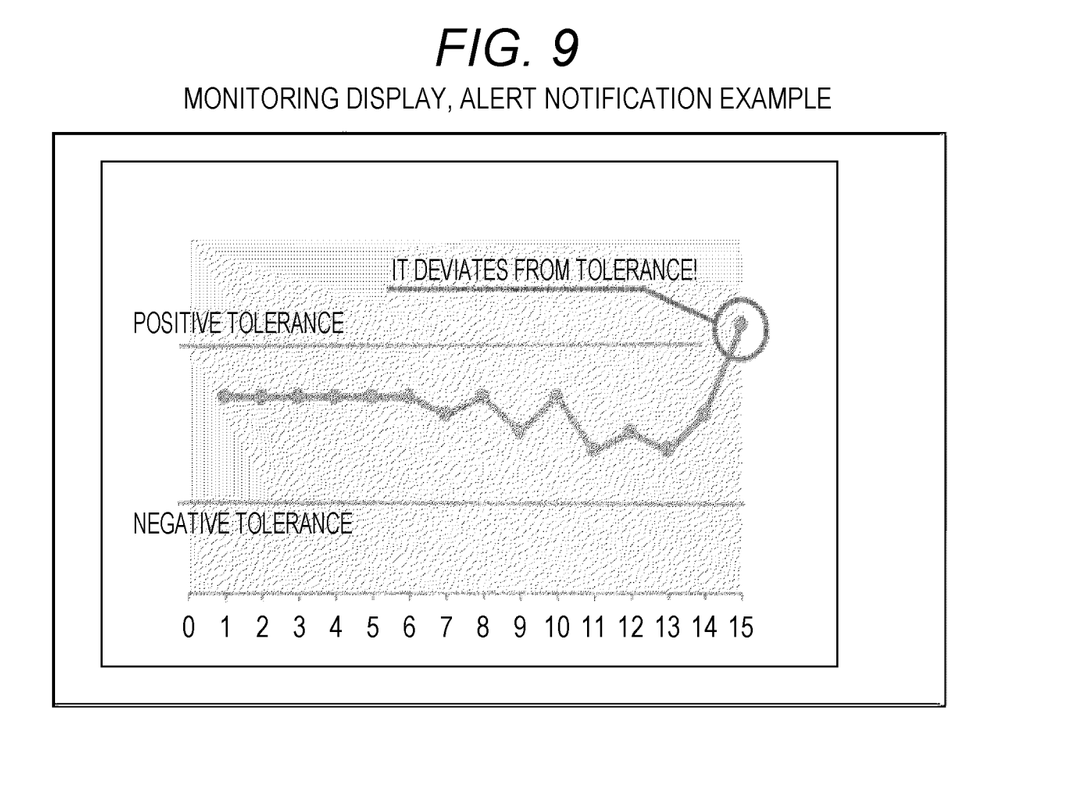
FIG. 9 is a view for illustrating an example of monitoring display and an example of alert notification in the system in one embodiment.

In the monitoring display, the SaaS type cloud 32 constantly monitors the result of the aggregation analysis processing, and in a case where this exceeds a predetermined critical threshold (for example, positive tolerance and negative tolerance), a corresponding graph display site (dot) is displayed in red, and alert notification (for example, "it deviates from tolerance!!") is displayed by visual display (refer to FIG. 9). In this case, the SaaS type cloud 32 may display a state of the corresponding measurement source on the screen by red flashing. Note that, as a threshold of an alert notification trigger, 3σ excess, measurement value difference excess and the like may also be set.

In addition, in the monitoring display, a critical threshold approaching threshold is set as the threshold of the alert notification trigger, and the SaaS type cloud 32 constantly monitors the result of the aggregation analysis processing, and in a case where this exceeds the critical threshold approaching threshold (for example, vicinity of the positive tolerance and vicinity of the negative tolerance), preliminary alert notification (for example, "it is likely to deviate from tolerance!!") may be displayed by visible display. In this case, the SaaS type cloud 32 may display by red display and red flashing in the above-described manner. That is, the SaaS type cloud 32 predicts in advance occurrence of process abnormality (quality abnormality) on the basis of the result of the aggregation analysis processing of the measurement data DD in the common format accumulated in the measurement database DB1.

As described above, the SaaS type cloud 32 of the cloud computing system 3 has a function of receiving the measurement data DD in the common format transmitted from each of the plurality of IoT relay devices 21 and performing the aggregation processing in the hierarchical structure in the measurement database DB1, a function of performing the aggregation analysis processing of the measurement data DD in the common format subjected to the accumulation processing for each integration target, and function of performing the display processing of the result of the aggregation analysis processing of the measurement data DD in the common format and transmitting the display processing result to the viewer terminal 4 in response to the display request from the viewer terminal 4.

In the SaaS type cloud 32, in order to logically realize each function described above, a processing program is installed as an application program in a flash memory. Then, in the SaaS type cloud 32, when the power is turned on, a processor (CPU) always develops this processing program in a RAM to execute. The measurement database DB1 and the like is formed in the flash memory, and updated while maintaining a predetermined data storage amount.

The viewer terminal 4 is a terminal such as a personal computer PC, a smartphone SP, and a tablet TB including a world wide web (Web) browser, and is used by a viewer of the business user.

The viewer terminal 4 has a function of transmitting the display request for requesting the display processing result of the measurement data DD in the common format from the cloud computing system 3 via the second communication network 6, a function of receiving the display processing result from the cloud computing system 3, and a function of displaying the received display processing results. The viewer of the business user may grasp the quality status in each process in each base on the basis of the display processing result displayed on the viewer terminal 4 and take required measures.

The hardware configuration of the viewer terminal 4 is not illustrated nor described because one skilled in the art may easily understood and implement the same. In the viewer terminal 4, in order to logically realize each function described above, a processing program is installed as an application program in a flash memory. Then, in the viewer terminal 4, when the power is turned on or upon instruction by the viewer, a processor (CPU) develops this processing program in a RAM to execute.

Measurement Solution Service Provision Processing

Figure 10:
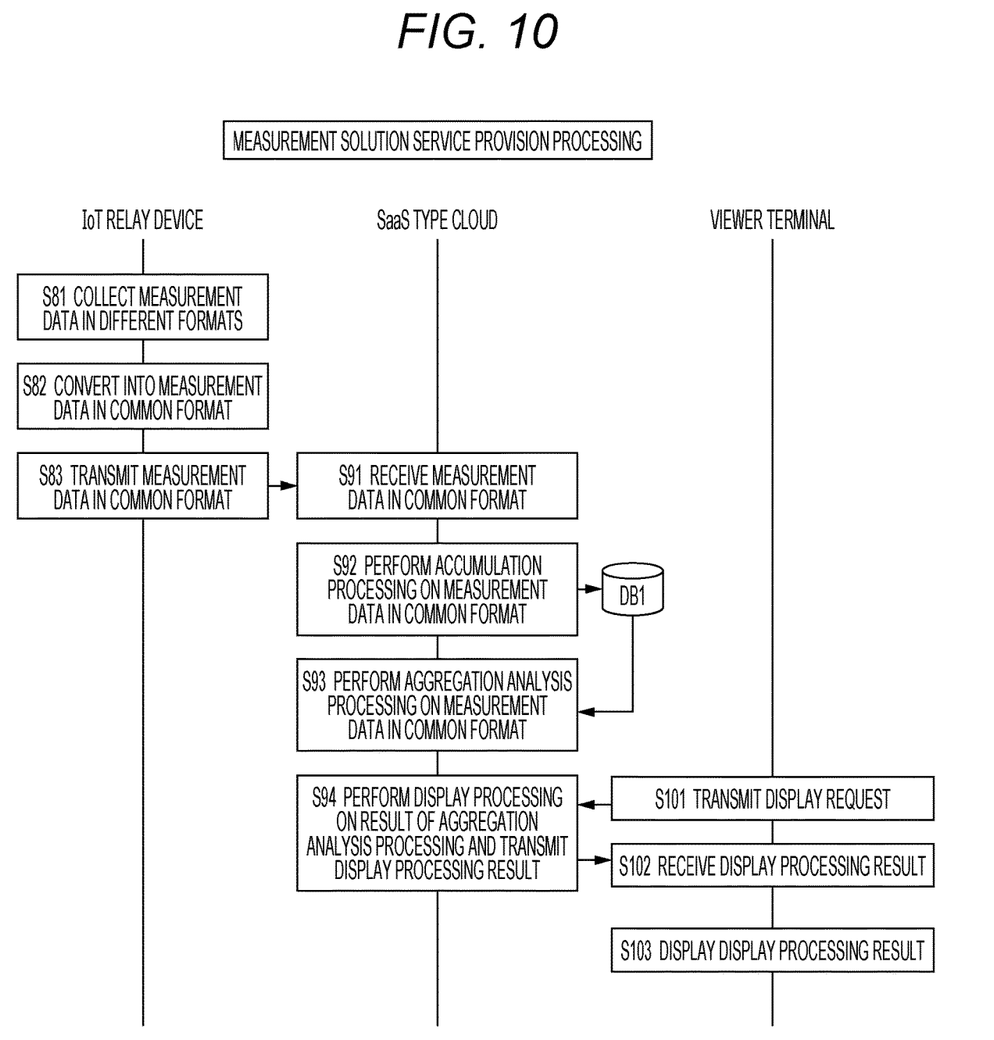
FIG. 10 is a sequence diagram for illustrating measurement solution service provision processing in the system of one embodiment.

Next, operation in the measurement solution service providing system 1 described above is described with reference to FIGS. 1 and 10 and the related drawings. FIG. 10 illustrates an example of a sequence of measurement solution service provision processing in the measurement solution service providing system 1 described above. Note that, in the following description, intervention of the communication networks 5 and 6 and the IoT hub 31 is omitted unless it is unclear.

In each IoT relay device 21, the processing program is activated in response to power on, and the processor (CPU) executes the processing described below.

[Processing S81 (refer to FIG. 10)] The measurement data AA, BB, and CC in the different formats transmitted from the plurality of measurement sources A, B, and C are collected.

[Processing S82] The collected measurement data AA, BB, and CC in the different formats are converted into the measurement data DD in the common format. When converting into the measurement data DD in the common format, the user identification information ID1, the base identification information ID2, the measurement source identification information ID3, and the measurement time information MT are added.

[Processing S83] The measurement data DD in the common format is transmitted to the cloud computing system 3. When transmitting the measurement data DD in the common format, the protocol is converted into the IP protocol.

Also, in the SaaS type cloud 32 of the cloud computing system 3, the processing program is activated when the power is turned on, and the processor (CPU) executes the processing described below.

[Processing S91 (refer to FIG. 10)] The measurement data DD in the common format transmitted from each IoT relay device 21 is received.

[Processing S92] The received measurement data DD in the common format is subjected to the accumulation processing in the measurement database DB1 in the hierarchical structure.

[Processing S93] The measurement data DD in the common format subjected to the accumulation processing is subjected to the aggregation analysis processing for each integration target.

[Processing S94] The display processing of the result of the aggregation analysis processing of the measurement data DD in the common format is performed, and the display processing result is transmitted to the viewer terminal 4 in response to the display request from the viewer terminal 4.

Furthermore, in the viewer terminal 4, the processing program is activated when the power is turned on or upon the instruction by the viewer, and the processor (CPU) executes the processing described below.

[Processing S101 (refer to FIG. 10)] The display request for requesting the display processing result of the measurement data DD in the common format is transmitted to the cloud computing system 3.

[Processing S102] The display processing result is received from the cloud computing system 3.

[Processing S103] The received display processing result is displayed.

Effect of One Embodiment

The measurement solution service providing system 1 of one embodiment described above may accumulate the measurement data DD in the common format in the cloud computing system 3 in corporation with the IoT technology and the cloud computing technology and perform the aggregation analysis processing and the display processing, thereby providing the innovative measurement solution service capable of grasping the quality status in each process in the manufacturing base (site) to the business user anytime and anywhere.

Also, in this measurement solution service providing system 1, the cloud computing system 3 processes the measurement data DD in the common format transmitted from each of the plurality of IoT relay devices 21 arranged in each base, so that it is possible to reduce a burden of the application software of the SaaS type cloud 32 and improve processing ability.

Variation

The processing in one embodiment described above is provided as a computer-executable program, and may be provided via a non-transitory computer-readable recording medium such as a CD-ROM or a flexible disk, and further via a communication line.

In addition, a plurality of or all of the processes in one embodiment described above may be selected and implemented in combination.

DESCRIPTION OF THE REFERENCE NUMERALS 1 measurement solution service providing system
2 device network
3 cloud computing system
4 viewer terminal
5 first communication network
6 second communication network
21 IoT relay device
22A measuring instrument
22B measuring instrument
22C measuring instrument
23A wireless transmitter
23B wireless transmitter
24 wireless receiver
31 IoT hub
32 SaaS type cloud
DB1 measurement database

The invention claimed is:

1. A measurement solution service providing system comprising:
   a plurality of relay devices each serving as an Internet-of-Things gateway and arranged in respective bases, each relay device configured to:
   collect measurement data in different formats transmitted from a plurality of measurement sources arranged in a distributed manner in each process in a base corresponding to a manufacturing site and measuring a quality status in each process,
   convert the collected measurement data in the different formats into measurement data in a common format, and
   transmit the measurement data in the common format via a communication network for requesting to process the converted measurement data in the common format, and
   a cloud computing system configured to:
   receive the measurement data in the common format transmitted from each of the plurality of relay devices arranged in the respective bases and performing accumulation processing in a hierarchical structure of a logical tree form in a measurement database,
   perform aggregation analysis processing on the measurement data in the common format subjected to the accumulation processing in the respective bases and for each integration target between the bases, and
   perform display processing on a result of the aggregation analysis processing of the measurement data in the common format and transits a display processing result to a viewer terminal in response to a display request from the viewer terminal;

wherein the measurement data in the common format is accumulated in the measurement database in the hierarchical structure of the logical tree form starting from identification information for specifying a user of the cloud computing system, branching at identification information for specifying the base corresponding to the manufacturing site and identification information for specifying the measurement source, and ending at a measurement value in the measurement source and measurement time information;

the aggregation analysis processing in the cloud computing system performs aggregation analysis processing on the measurement data for the each integration target between the bases by recognizing a relationship between the bases under the same starting point on the basis of a measurement unit of the measurement value or a type of the measurement source as for the measurement value in the measurement source accumulated in the measurement database as an ending point of the hierarchical structure of the logical tree form.

2. The measurement solution service providing system according to claim 1, wherein the measurement data in the different formats have data lengths different from each other and include at least the measurement value in a measurement source as an item, and the measurement data in the common format has a predetermined data length and includes at least the identification information for specifying the user of the cloud computing system, the identification information for specifying the base corresponding to the manufacturing site, the identification information for specifying the measurement source, the measurement value in the measurement source, and the measurement time information as items determined in advance.

3. The measurement solution service providing system according to claim 1, wherein the measurement data in the common format is subjected to the aggregation analysis processing by statistical process control analysis so that graph display, data display, and monitoring display on the viewer terminal are selectively available.

4. The measurement solution service providing system according to claim 3, wherein the cloud computing system is further configured to constantly monitor a result of the aggregation analysis processing in the monitoring display, and perform alert notification by visual display in a case of exceeding a predetermined threshold.

5. The measurement solution service providing system according to claim 3, wherein the cloud computing system is further configured to constantly monitor a result of the aggregation analysis processing in the monitoring display, and perform preliminary alert notification by visual display in a case of exceeding an approaching threshold to a critical threshold determined in advance.

6. The measurement solution service providing system according to claim 1, wherein each of the plurality of measurement sources includes a measuring instrument, the cloud computing system is a SaaS type cloud, and the communication network is an IP network.

7. A measurement solution service providing method comprising:

by a plurality of relay devices each serving as an Internet-of-Things gateway and arranged in respective bases, processing the following;

collecting measurement data in different formats transmitted from a plurality of measurement sources arranged in a distributed manner in each process in a base corresponding to a manufacturing site and measuring a quality status in each process, converting the collected measurement data in the different formats into measurement data in a common format, and transmitting the measurement data in the common format via a communication network for requesting to process the converted measurement data in the common format, and by a cloud computing system, processing the following;

receiving the measurement data in the common format transmitted from each of the plurality of relay devices arranged in the respective bases and performing accumulation processing in a hierarchical structure of a logical tree form in a measurement database, performing aggregation analysis processing on the measurement data in the common format subjected to the accumulation processing in the respective bases and for each integration target between the bases, and performing display processing on a result of the aggregation analysis processing of the measurement data in the common format and transmitting a display processing result to a viewer terminal in response to a display request from the viewer terminal;

wherein the measurement data in the common format is accumulated in the measurement database in the hierarchical structure of the logical tree form starting from identification information for specifying a user of the cloud computing system, branching at identification information for specifying the base corresponding to the manufacturing site and identification information for specifying the measurement source, and ending at a measurement value in the measurement source and measurement time information;

the performing the aggregation analysis processing in the cloud computing system performs aggregation analysis processing on the measurement data for the each integration target between the bases by recognizing a relationship between the bases under the same starting point on the basis of a measurement unit of the measurement value or a type of the measurement source as for the measurement value in the measurement source accumulated in the measurement database as an ending point of the hierarchical structure of the logical tree form.

8. The measurement solution service providing method according to claim 7, wherein the measurement data in the different formats have data lengths different from each and include at least the measurement value in a measurement source as an item, and the measurement data in the common format has a predetermined data length and includes at least the identification information for specifying the user of the cloud computing system, the identification information for specifying the base corresponding to the manufacturing site, the identification information for specifying the measurement source, the measurement value in the measurement source, and the measurement time information as items determined in advance.

9. The measurement solution service providing method according to claim 7,
wherein the measurement data in the common format is subjected to the aggregation analysis processing by statistical process control analysis so that graph display, data display, and monitoring display on the viewer terminal are selectively available.

10. The measurement solution service providing method according to claim 9,
wherein the cloud computing system further includes constantly monitoring a result of the aggregation analysis processing in the monitoring display, and performing alert notification by visual display in a case of exceeding a predetermined threshold.

11. The measurement solution service providing method according to claim 9,
wherein the cloud computing system further includes constantly monitoring a result of the aggregation analysis processing in the monitoring display, and performing preliminary alert notification by visual display in a case of exceeding an approaching threshold to a critical threshold determined in advance.

12. A measurement solution service providing system comprising:
a plurality of relay devices each serving as an Internet-of-Things gateway and arranged in respective bases, each relay device configured to:
collect measurement data transmitted from a plurality of measurement sources, and
transmit the measurement data via a communication network for requesting to process the collected measurement data, and
a cloud computing system configured to:
receive the measurement data transmitted from each of the plurality of relay devices arranged in the respective bases and performing accumulation processing in a hierarchical structure of a logical tree form in a measurement database,
perform aggregation analysis processing on the measurement data subjected to the accumulation processing in the respective bases and for each integration target between the bases, and
perform display processing on a result of the aggregation analysis processing of the measurement data and transmit a display processing result in response to a display request;
wherein the measurement data is accumulated in the measurement database in the hierarchical structure of the logical tree form starting from identification information for specifying a user of the cloud computing system, branching at identification information for specifying a base and identification information for specifying the measurement source, and ending at a measurement value in the measurement source and measurement time information;
the aggregation analysis processing in the cloud computing system performs aggregation analysis processing on the measurement data for the each integration target between the bases by recognizing a relationship between the bases under the same starting point on the basis of a measurement unit of the measurement value or a type of the measurement source as for the measurement value in the measurement source accumulated in the measurement database as an ending point of the hierarchical structure of the logical tree form.

13. A measurement solution service providing method comprising:
a plurality of relay devices each serving as an Internet-of-Things gateway and arranged in respective bases, processing;
collecting measurement data transmitted from a plurality of measurement sources, and
transmitting the measurement data via a communication network for requesting to process the collected measurement data, and
by a cloud computing system, processing;
receiving the measurement data transmitted from each of the plurality of relay devices arranged in the respective bases and performing accumulation processing in a hierarchical structure of a logical tree form in a measurement database,
performing aggregation analysis processing on the measurement data subjected to the accumulation processing in the respective bases and for each integration target between the bases, and
performing display processing on a result of the aggregation analysis processing of the measurement data and transmitting a display processing result in response to a display request;
wherein the measurement data is accumulated in the measurement database in the hierarchical structure of the logical tree form starting from identification information for specifying a user of the cloud computing system, branching at identification information for specifying a base and identification information for specifying the measurement source, and ending at a measurement value in the measurement source and measurement time information;
the performing the aggregation analysis processing in the cloud computing system performs aggregation analysis processing on the measurement data for the each integration target between the bases by recognizing a relationship between the bases under the same starting point on the basis of a measurement unit of the measurement value or a type of the measurement source as for the measurement value in the measurement source accumulated in the measurement database as an ending point of the hierarchical structure of the logical tree form.

14. A cloud computing system which works in cooperation with a plurality of relay devices each serving as an Internet-of-Things gateway and each configured to collect measurement data transmitted from a plurality of measurement sources, and transmit the measurement data via a communication network for requesting to process the collected measurement data, the cloud computing system configured to:
receive the measurement data transmitted from each of the plurality of relay devices arranged in respective bases and performing accumulation processing in a hierarchical structure of a logical tree form in a measurement database,
perform aggregation analysis processing on the measurement data subjected to the accumulation processing in the respective bases and for each integration target between the bases, and
perform display processing on a result of the aggregation analysis processing of the measurement data and transmit a display processing result in response to a display request;
wherein the measurement data is accumulated in the measurement database in the hierarchical structure of the logical tree form starting from identification information for specifying a user of the cloud computing system, branching at identification information for specifying a base and identification information for specifying the measurement source, and ending at a measurement value in the measurement source and measurement time information;

the aggregation analysis processing performs aggregation analysis processing on the measurement data for the each integration target between the bases by recognizing a relationship between the bases under the same starting point on the basis of a measurement unit of the measurement value or a type of the measurement source as for the measurement value in the measurement source accumulated in the measurement database as an ending point of the hierarchical structure of the logical tree form.

15. A non-transitory readable medium recorded with a program that causes a cloud computing system, which works in cooperation with a plurality of relay devices each serving as an Internet-of-Things gateway and each configured to collect measurement data transmitted from a plurality of measurement sources, and transmit the measurement data via a communication network for requesting to process the collected measurement data, to execute processing comprising:

receiving the measurement data transmitted from each of the plurality of relay devices arranged in respective bases and performing accumulation processing in a hierarchical structure of a logical tree form in a measurement database, performing aggregation analysis processing on the measurement data subjected to the accumulation processing in the respective bases and for each integration target between the bases, and performing display processing on a result of the aggregation analysis processing of the measurement data and transmitting a display processing result in response to a display request;

wherein the measurement data is accumulated in the measurement database in the hierarchical structure of the logical tree form starting from identification information for specifying a user of the cloud computing system, branching at identification information for specifying a base and identification information for specifying the measurement source, and ending at a measurement value in the measurement source and measurement time information;

the performing the aggregation analysis processing performs aggregation analysis processing on the measurement data for the each integration target between the bases by recognizing a relationship between the bases under the same starting point on the basis of a measurement unit of the measurement value or a type of the measurement source as for the measurement value in the measurement source accumulated in the measurement database as an ending point of the hierarchical structure of the logical tree form.

* * * * *